(12) United States Patent
Cintuglu et al.

(10) Patent No.: US 12,483,063 B2
(45) Date of Patent: Nov. 25, 2025

(54) SECURE DISTRIBUTED STATE ESTIMATION FOR NETWORKED MICROGRIDS

(71) Applicants: ABB Schweiz AG, Baden (CH); Hitachi Energy Ltd, Zürich (CH)

(72) Inventors: Mehmet H. Cintuglu, Raleigh, NC (US); Dmitry Ishchenko, Cary, NC (US)

(73) Assignees: Hitachi Energy Ltd, Zurich (CH); ABB Schweiz AG, Baden (CH)

(*) Notice: Subject to any disclaimer, the term of this patent is extended or adjusted under 35 U.S.C. 154(b) by 727 days.

(21) Appl. No.: 16/142,103

(22) Filed: Sep. 26, 2018

(65) Prior Publication Data
US 2020/0099252 A1   Mar. 26, 2020

(51) Int. Cl.
    *H02J 13/00* (2006.01)
    *G01R 21/133* (2006.01)
    *G06F 17/16* (2006.01)

(52) U.S. Cl.
    CPC ...... *H02J 13/00001* (2020.01); *G01R 21/133* (2013.01); *G06F 17/16* (2013.01)

(58) Field of Classification Search
    CPC .............................................. H02J 13/00001
    See application file for complete search history.

(56) References Cited

U.S. PATENT DOCUMENTS

| | | |
|---|---|---|
| 2002/0008657 A1 | 1/2002 | Poore Jr. |
| 2006/0064291 A1 | 3/2006 | Pattipatti et al. |

(Continued)

FOREIGN PATENT DOCUMENTS

| | | |
|---|---|---|
| CN | 102495288 A | 6/2012 |
| CN | 108432079 A | 8/2018 |

(Continued)

OTHER PUBLICATIONS

Masashi et al., "Convergence improvement and bad data detection for fast-decoupled state estimator using optimal multiplier," IEEE Power Engineering Society (2006).*

(Continued)

*Primary Examiner* — Hyun D Park
(74) *Attorney, Agent, or Firm* — Slater Matsil, LLP

(57) ABSTRACT

Systems, methods, techniques and apparatuses of networked microgrids are disclosed. One exemplary embodiment is a method for removing false data from a networked microgrid system including: calculating a first local state estimation with the microgrid control system; calculating a plurality of global state estimations with the microgrid control system and the plurality of microgrids; determining the plurality of global state estimations did not converge; detecting false data in a first global state estimation of the plurality of global state estimations calculated with the microgrid control system using the microgrid control system and the plurality of microgrids; and removing the first global state estimation from the plurality of global state estimations; and iteratively updating the remaining global state estimations of the plurality of global state estimations with the microgrid control system and the plurality of microgrids until the remaining global state estimations of the plurality of global state estimations converge.

24 Claims, 7 Drawing Sheets

(56) References Cited

U.S. PATENT DOCUMENTS

| | | | |
|---|---|---|---|
| 2008/0004840 | A1 | 1/2008 | Pattipatti et al. |
| 2011/0125323 | A1 | 5/2011 | Gutmann et al. |
| 2012/0046889 | A1 | 2/2012 | Sun et al. |
| 2013/0226538 | A1* | 8/2013 | Donde ............... G06F 30/00 703/2 |
| 2016/0187223 | A1 | 6/2016 | Preston et al. |
| 2016/0191163 | A1 | 6/2016 | Preston et al. |
| 2017/0317498 | A1 | 11/2017 | Guo et al. |
| 2017/0331842 | A1 | 11/2017 | Kikuchi |
| 2018/0024900 | A1 | 1/2018 | Premerlani et al. |
| 2018/0301903 | A1 | 10/2018 | Majumder et al. |
| 2019/0372391 | A1* | 12/2019 | Frame ............... H02J 13/0093 |

FOREIGN PATENT DOCUMENTS

| | | |
|---|---|---|
| JP | H0973573 A | 3/1997 |
| JP | 2012068947 A | 4/2012 |
| JP | 2016208629 A | 12/2016 |
| JP | 2017204722 A | 11/2017 |
| JP | 2018032382 A | 3/2018 |
| WO | 2018048351 A1 | 3/2018 |

OTHER PUBLICATIONS

S.C. Bronin & P.R. Mccary, "Peaceful Coexistence: Independent Microgrids are Coming," Public Utilities Fortnightly, dated Mar. 2013, 6 pages, available at http://works.bepress.com/bronin/16/, last accessed Sep. 12, 2018.

M. Shahidehpour et al., "Networked Microgrids: Exploring the Possibilities of the IIT-Bronzeville Grid," IEEE Power and Energy Magazine, dated Jul./Aug. 2017, pp. 63-71, vol. 15, No. 4, IEEE, New York, USA.

A. Primadianto & C.N. Lu, "A Review on Distribution System State Estimation," IEEE Transactions on Power Systems, dated Sep. 2017, p. 3875-3883, vol. 32, No. 5, IEEE, New York, USA.

F.C. Schweppe & J. Wildes, "Power System Static-State Estimation, Part I: Exact Model," IEEE Transactions on Power Apparatus and Systems, dated Jan. 1970, vol. PAS-89, No. 1, pp. 120-125, IEEE, New York, USA.

F.C. Schweppe & D.B. Rom, "Power System Static-State Estimation, Part II: Approximate Model," IEEE Transactions on Power Apparatus and Systems, dated Jan. 1970, vol. PAS-89, No. 1, pp. 125-130, IEEE, New York, USA.

F.C. Schweppe, "Power System Static-State Estimation, Part III: Implementation," IEEE Transactions on Power Apparatus and Systems, dated Jan. 1970, vol. PAS-89, No. 1, pp. 130-135, IEEE, New York, USA.

W. Jiang et al., "A Distributed State Estimator Utilizing Synchronized Phasor Measurements," IEEE Transactions on Power Systems, dated May 2007, pp. 563-571, vol. 22, No. 2, IEEE, New York, USA.

G.N. Korres, "A Distributed Multiarea State Estimation," IEEE Transactions on Power Systems, dated Feb. 2011, pp. 73-84, vol. 26, No. 1, IEEE, New York, USA.

D.M. Falcão, "Parallel and Distributed State Estimation," IEEE Transactions on Power Systems, dated May 1995, pp. 724-730, vol. 10, No. 2, IEEE, New York, USA.

Y. Deng et al., "A Branch-Estimation-Based State Estimation Method for Radial Distribution Systems," IEEE Transactions on Power Delivery, dated Oct. 2002, pp. 1057-1062, vol. 17, No. 4, IEEE, New York, USA.

J.B. Leite & J.R.S. Mantovani, "Distribution System State Estimation Using the Hamiltonian Cycle Theory," IEEE Transactions on Smart Grid, dated Jan. 2016, pp. 366-375, vol. 7, No. 1, IEEE, New York, USA.

T. Van Cutsem et al., "A Two-Level Static State Estimator for Electric Power Systems," IEEE Transactions on Power Apparatus and Systems, dated Aug. 1981, pp. 3722-3732, vol. PAS-100, No. 8, IEEE, New York, USA.

L. Zhao & A. Abur, "Multiarea State Estimation Using Synchronized Phasor Measurements," IEEE Transactions on Power Systems, dated May 2005, pp. 611-617, vol. 20, No. 2, IEEE, New York, USA.

A.J. Conejo et al., "An Optimization Approach to Multiarea State Estimation," IEEE Transactions on Power Systems, dated Feb. 2007, pp. 213-221, vol. 22, No. 1, IEEE, New York, USA.

E. Caro et al., "Decentralized State Estimation and Bad Measurement Identification: An Efficient Lagrangian Relaxation Approach," IEEE Transactions on Power Systems, dated Nov. 2011, pp. 2500-2508, vol. 26, No. 4, IEEE, New York, USA.

M.E. Baran & A.W. Kelley, "State Estimation for Real-Time Monitoring of Distribution Systems," IEEE Transactions on Power Systems, dated Aug. 1994, pp. 1601-1609, vol. 9, No. 3, IEEE, New York, USA.

F.F. Wu, "Power system state estimation: a survey," International Journal of Electrical Power & Energy Systems, dated Apr. 1990, pp. 80-87, vol. 12, No. 2, Elsevier Ltd., Amsterdam, Netherlands.

N. Xia et al., "Decentralized State Estimation for Hybrid AC/DC Microgrids," IEEE Systems Journal, dated Mar. 2018, pp. 434-443, vol. 12, No. 1, IEEE, New York, USA.

V. Donde et al., "Distributed State Estimation of Hybrid AC/HVDC Grids by Network Decomposition," IEEE Transactions on Smart Grid, dated Mar. 2016, pp. 974-981, vol. 7, No. 2, IEEE, New York, USA.

H. Karimipour & V. Dinavahi, "Parallel Domain-Decomposition-Based Distributed State Estimation for Large-Scale Power Systems," IEEE Transactions on Industry Applications, dated March/Apr. 2016, pp. 1265-1269, vol. 52, No. 2, IEEE, New York, USA.

V. Kekatos & G.B. Giannakis, "Distributed Robust Power System State Estimation," IEEE Transactions on Power Systems, dated May 2013, pp. 1617-1626, vol. 28, No. 2, IEEE, New York, USA.

L. Xie et al., "Fully Distributed State Estimation for Wide-Area Monitoring Systems," IEEE Transactions on Smart Grid, dated Sep. 2012, pp. 1154-1169, vol. 3, No. 3, IEEE, New York, USA.

S. Kar et al., "Distributed State Estimation and Energy Management in Smart Grids: A Consensus+Innovations Approach," IEEE Journal of Selected Topics in Signal Processing, dated Dec. 2014, pp. 1022-1038, vol. 8, No. 6, IEEE, New York, USA.

A. Minot et al., "A Distributed Gauss-Newton Method for Power System State Estimation," IEEE Transactions on Power Systems, dated Sep. 2016, pp. 3804-3815, vol. 31, No. 5, IEEE, New York, USA.

M. Cosovic & D. Vukobratovic, "Distributed Gauss-Newton Method for AC State Estimation: A Belief Propagation Approach," 2016 IEEE International Conference on Smart Grid Communications (SmartGridComm): Control and Operation for Smart Grids, Microgrids and Distributed Resources, dated Dec. 12, 2016, 7 pages, IEEE, New York, USA.

W. Zhang et al., "Multiagent System-Based Integrated Solution for Topology Identification and State Estimation," IEEE Transactions on Industrial Informatics, dated Apr. 2017, pp. 714-724, vol. 13, No. 2, IEEE, New York, USA.

M.H. Cintuglu et al., "Development and Application of a Real-Time Testbed for Multiagent System Interoperability: A Case Study on Hierarchical Microgrid Control," IEEE Transactions on Smart Grid, dated May 2018, pp. 1759-1768, vol. 9, No. 3, IEEE, New York, USA.

M.H. Cintuglu et al., "Protection of Autonomous Microgrids Using Agent-Based Distributed Communication," IEEE Transactions on Power Delivery, dated Feb. 2017, pp. 351-360, vol. 32, No. 1, IEEE, New York, USA.

Y. Liu et al., "False Data Injection Attacks Against State Estimation in Electric Power Grids," ACM Transactions on Information System Security, Article 13, dated May 2011, 33 pages, vol. 14, No. 1, ACM, Inc., New York, USA.

G. Liang et al., "A Review of False Data Injection Attacks Against Modern Power Systems," IEEE Transactions on Smart Grid, dated Jul. 2017, pp. 1630-1638, vol. 8, No. 4, IEEE, New York, USA.

R. Deng et al., "False Data Injection on State Estimation in Power Systems-Attacks, Impacts, and Defense: A Survey," IEEE Transactions on Industrial Informatics, dated Apr. 2017, pp. 411-423, vol. 13, No. 2, IEEE, New York, USA.

(56) References Cited

OTHER PUBLICATIONS

L. Xie et al., "Integrity Data Attacks in Power Market Operations," IEEE Transactions on Smart Grid, dated Dec. 2011, pp. 659-666, vol. 2, No. 4, IEEE, New York, USA.
Y. Yuan et al., "Modeling Load Redistribution Attacks in Power Systems," IEEE Transactions on Smart Grid, dated Jun. 2011, pp. 382-390, vol. 2, No. 2, IEEE, New York, USA.
D.H. Choi & L. Xie, "Fully Distributed Bad Data Processing for Wide Area State Estimation," 2011 IEEE International Conference on Smart Grid Communications (SmartGridComm): Wide-Area Monitoring, Control & Protection, dated Dec. 15, 2011, pp. 546-561, IEEE, New York, USA.
O. Yuković & G. Dán, "Security of Fully Distributed Power System State Estimation: Detection and Mitigation of Data Integrity Attacks," IEEE Journal on Selected Areas in Communications, dated Jul. 2014, pp. 1500-1508, vol. 32, No. 7, IEEE, New York, USA.
X. Zhao & A.H. Sayed, "Distributed Clustering and Learning Over Networks," IEEE Transactions on Signal Processing, dated Jul. 1, 2015, pp. 3285-3300, vol. 63, No. 13, IEEE, New York, USA.
S. Khawatmi et al., "Decentralized Clustering and Linking by Networked Agents," IEEE Transactions on Signal Processing, dated Jul. 1, 2017, pp. 3526-3537, vol. 65, No. 13, IEEE, New York, USA.
A.H. Sayed, "Diffusion Adaptation Over Networks," Academic Press Library in Signal Processing, dated 2014, 115 pages, vol. 3, Elsevier Ltd., Amsterdam, Netherlands.
A. Abur & A. Expósito, "Weighted Least Squares State Estimation," Power System State Estimation: Theory and Implementation, dated Mar. 24, 2004, 28 pages, CRC Press, London, United Kingdom.
Gomez-Exposito, A., et al., "A taxonomy of multi-area state estimation methods," Electric Power Systems Research, Elsevier, vol. 81, No. 4, Nov. 16, 2010, 10 pages.
Gomez-Exposito, A., et al., "A Multilevel State Estimation Paradigm for Smart Grids," Proceedings of the IEEE, vol. 99, No. 6, Jun. 2011, 25 pages.
Yang, X., "Fast Decoupled Multi Area State Estimation with PMUs Measurements," IEEE PES ISGT Asia, May 21, 2012, 7 pages.
European Patent Office, Supplementary European Search Report for Application No. EP 19 86 6323, May 5, 2022, 12 pages.
Geng, L., et al., "Microgrid power system state estimation modeling and algorithm comparison," Metallurgical Electrical, vol. 32, Issue 04, Feb. 2013, 10 total pages.
Choi, S., et al., "Autonomous State Estimation Based Diagnostic System in Smart Grid," 2013 IEEE Pes Innovative Smart Grid Technologies Conference (ISGT), Washington, DC, USA, Feb. 24-27, 2013, 6 pages.
Jia, D., et al., "Smart Power Distribution Network State Estimation Based on Extra-short Term Load Forecast," Power Construction, vol. 34, Issue 1, Jan. 2013, 10 total pages.

\* cited by examiner

Distributed Node and Phase Angle Discovery Algorithm

| Iteration | | Agent(1) | Agent(2) | Agent(3) | Agent(4) | Agent(5) |
|---|---|---|---|---|---|---|
| (0) | Known Node | 1 | 2 | 3 | 4 | 5 |
|  | Discovered Node | — | — | — | — | — |
|  | Known Phase Angle | — | — | — | — | — |
|  | Discovered Phase Angle | — | — | — | — | — |
| (1) | Known Node | 1 | 2 | 3 | 4 | 5 |
|  | Discovered Node | 2 3 | 1 | 1 4 5 | 3 | 3 |
|  | Known Phase Angle | — | — | — | — | — |
|  | Discovered Phase Angle | $\theta_{1-2}\ \theta_{1-3}$ | $\theta_{1-2}$ | $\theta_{1-3}\ \theta_{3-4}\ \theta_{3-5}$ | $\theta_{3-4}$ | $\theta_{3-5}$ |
| (2) | Known Node | 1 2 3 | 1 2 | 1 3 4 5 | 3 4 | 3 5 |
|  | Discovered Node | 4 5 | 3 | 2 | 1 5 | 1 4 |
|  | Known Phase Angle | $\theta_{1-2}\ \theta_{1-3}$ | $\theta_{1-2}$ | $\theta_{1-3}\ \theta_{3-4}\ \theta_{3-5}$ | $\theta_{3-4}$ | $\theta_{3-5}$ |
|  | Discovered Phase Angle | $\theta_{3-4}\ \theta_{3-5}$ | $\theta_{1-3}$ | $\theta_{1-2}$ | $\theta_{1-3}\ \theta_{3-5}$ | $\theta_{1-3}\ \theta_{3-4}$ |
| (3) | Known Node | 1 2 3 4 5 | 1 2 3 | 1 2 3 4 5 | 1 3 4 5 | 1 3 4 5 |
|  | Discovered Node | — | 4 5 | — | 2 | 2 |
|  | Known Phase Angle | $\theta_{1-2}\ \theta_{1-3}\ \theta_{3-4}\ \theta_{3-5}$ | $\theta_{1-2}\ \theta_{1-3}$ | $\theta_{1-2}\ \theta_{1-3}\ \theta_{3-4}\ \theta_{3-5}$ | $\theta_{1-3}\ \theta_{3-4}\ \theta_{3-5}$ | $\theta_{1-3}\ \theta_{3-4}\ \theta_{3-5}$ |
|  | Discovered Phase Angle | — | $\theta_{3-4}\ \theta_{3-5}$ | — | $\theta_{1-2}$ | $\theta_{1-2}$ |
| (4) | Known Node | 1 2 3 4 5 | 1 2 3 4 5 | 1 2 3 4 5 | 1 2 3 4 5 | 1 2 3 4 5 |
|  | Discovered Node | — | — | — | — | — |
|  | Known Phase Angle | $\theta_{1-2}\ \theta_{1-3}\ \theta_{3-4}\ \theta_{3-5}$ | $\theta_{1-2}\ \theta_{1-3}\ \theta_{3-4}\ \theta_{3-5}$ | $\theta_{1-2}\ \theta_{1-3}\ \theta_{3-4}\ \theta_{3-5}$ | $\theta_{1-2}\ \theta_{1-3}\ \theta_{3-4}\ \theta_{3-5}$ | $\theta_{1-2}\ \theta_{1-3}\ \theta_{3-4}\ \theta_{3-5}$ |
|  | Discovered Phase Angle | — | — | — | — | — |

Fig. 5

SECURE DISTRIBUTED STATE ESTIMATION FOR NETWORKED MICROGRIDS

STATEMENT REGARDING FEDERALLY SPONSORED RESEARCH OR DEVELOPMENT

This invention was made with U.S. Government support under Contract No. DE-OE0000831 awarded by the Department of Energy. The Government has certain rights in this invention.

BACKGROUND

The present disclosure relates generally to networked microgrids, which are interconnected portions of a power network including at least one power source and one load capable of operating independently if disconnected from the rest of the power network. State estimation in a networked microgrid system enables online monitoring and network awareness. In some systems, state estimation is performed at a centralized location. All data is transmitted to one central controller so that state estimation can be performed. As the number of microgrids and communicative devices within a power network increases, the computational performance constraints for real-time centralized state estimation increases exponentially. Distributed state estimation is one alternative to centralized state estimation, where state estimation is performed by multiple local control systems rather than one centralized control system.

SUMMARY OF THE DISCLOSURE

Exemplary embodiments of the disclosure include unique systems, methods, techniques and apparatuses for networked microgrids. Further embodiments, forms, objects, features, advantages, aspects and benefits of the disclosure shall become apparent from the following description and drawings.

BRIEF DESCRIPTION OF THE DRAWINGS

FIG. 5 is a table illustrating an exemplary initialization process for the networked microgrid system in FIG. 1.

DETAILED DESCRIPTION OF ILLUSTRATIVE EMBODIMENTS

Figure 1:
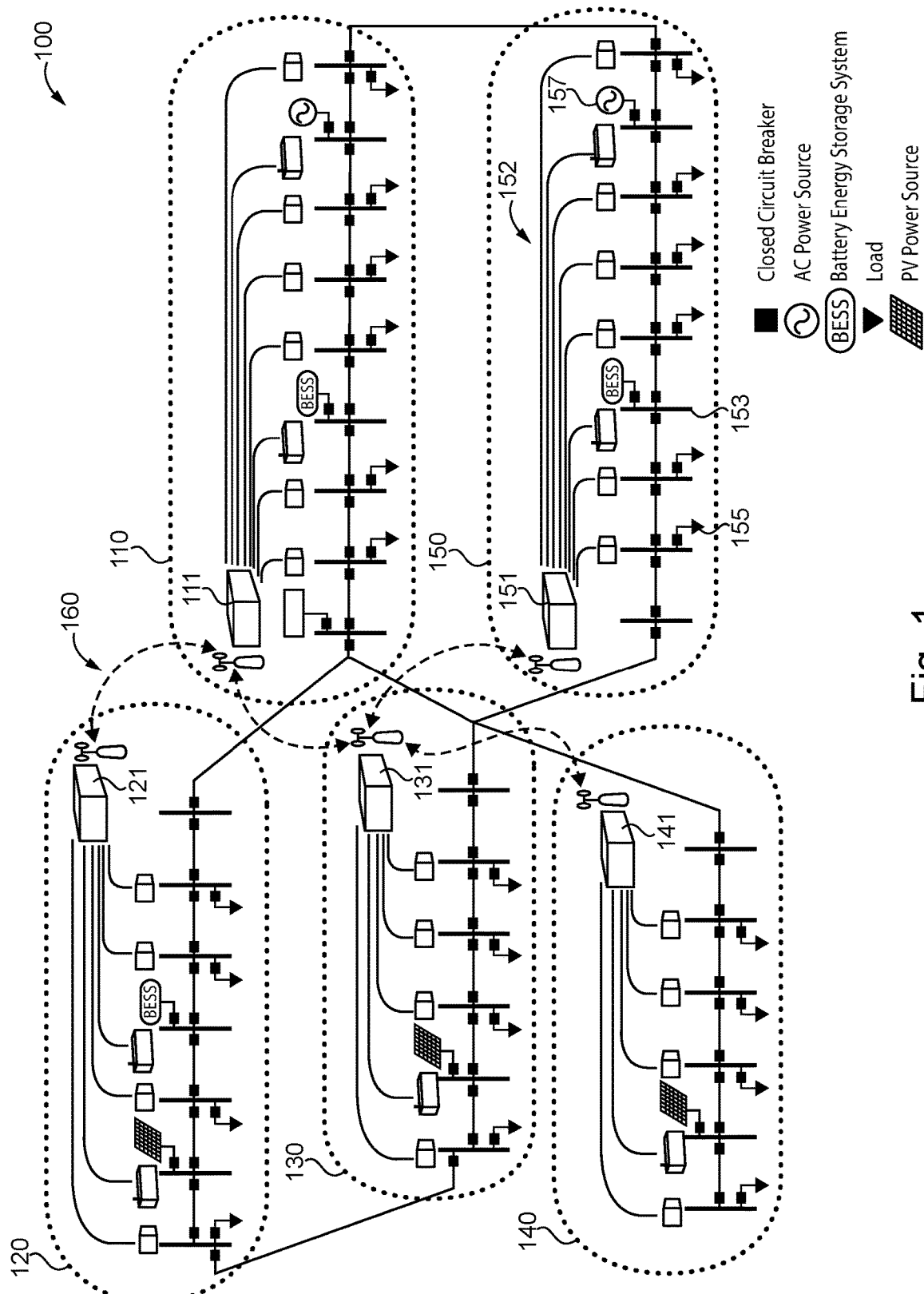
FIG. 1 illustrates an exemplary networked microgrid system.

With reference to FIG. 1, there is illustrated a networked microgrid system 100. It shall be appreciated that system 100 may be implemented in a variety of applications, including utility grid distribution systems, industrial plant distribution systems, and vehicular distribution systems, to name but a few examples. It shall be appreciated that the topology of system 100 is illustrated for the purpose of explanation and is not intended as a limitation of the present disclosure. For example, system 100 may include more or fewer microgrids and the microgrids of system 100 may be arranged in any configuration as long as each microgrid is coupled to at least one other microgrid. Furthermore, it shall be appreciated that the topology of each microgrid is illustrated for the purpose of explanation and is not intended as a limitation of the present disclosure. For example, microgrid 110 may include more or fewer buses, more or fewer power sources, more or fewer energy storage devices, more or fewer loads, and more or fewer field devices. Although system 100 is illustrated with a single line diagram, system 100 may be structured to transmit single phase alternating current (AC) power or multiphase AC power, or direct current (DC) power.

System 100 includes microgrids 110, 120, 130, 140 and 150. Each microgrid includes at least one load and at least one power source coupled to one of a plurality of buses. Each microgrid includes a plurality of field devices structured to measure electrical or physical characteristics of the microgrid. For example, microgrid 150 includes a plurality of buses including bus 153, a plurality of loads including load 155, an AC power source 157, and a plurality of field devices 152.

AC power source 157 may include a solar panel array, a wind turbine, a natural gas generator, or any other device or system structured to generate power. Load 155 may be any type of device or system structured to consume power. The plurality of field devices 152 may include voltage sensors, intelligent electronic devices (LEDs), remote terminal units (RTUs), relays, reclosers, current sensors, voltage transformers, and current transformers, to name but a few examples.

Each microgrid also includes a microgrid control system coupled to the plurality of field devices by way of a plurality of communication channels. For example, microgrid 150 includes microgrid control system 151, which is coupled to plurality of field devices 152 by way of a plurality of communication channels. Each microgrid control system is structured to monitor electrical and physical characteristics of the microgrid, operate controllable devices in the microgrid, and protect the devices coupled to the microgrid from faults and other conditions.

Microgrid control systems 111, 121, 131, 141, and 151 are structured to communicate by way of a communication network 160 including communication channels coupled with one or more neighboring microgrid control systems. In the illustrated embodiment, microgrid control system 111 communicates with microgrid control systems 121 and 131; microgrid control system 121 communicates only with microgrid control system 111; microgrid control system 131 communicates with microgrid control systems 111, 141, and 151; microgrid control system 141 communicates only with microgrid control system 131; and microgrid control system 151 communicates only with microgrid control system 131.

The communication channels between field devices and a microgrid control system, as well as between microgrids, may be wired or wireless. Each communication channel may use standardized communication protocols, such as IEC 61850, OPC UA, Pub-Sub, XMPP, or DDS, to name but a few examples. In certain embodiments, where standardized communication protocols are insufficient to define behavior of microgrids for distributed state estimation, semantics of the exchanged messages may be defined using common knowledge representations.

For example, the Foundation for Intelligent Physical Agents (FIPA) standard implements Agent Communication Language (ACL) to describe the semantics of exchanged messages. The content of an ACL message includes the object of the action and parameters passed through the message. Sender and receiver parameters designate the name of the sender and intended recipient agents. ACL messages express communicative acts such as informing, requesting, refusing, subscribing, and propagating, to name but a few examples. IEC 61850 communication protocols may be extended using non-standardized IEC 61850 logical nodes as Abstract Communication Service Interface (ACSI) based on ACL communication acts, and can be mapped to GOOSE messages.

Existing distributed state estimation systems suffer from a number of shortcomings and disadvantages. There remain unmet needs including increasing cyber security and adhering to increased privacy concerns. For instance, microgrids must rely on the security of other microgrids, as well as the security of the communication system to perform distributed state estimation. A security breach of just one microgrid may be sufficient to cause a cascading power network failure. Furthermore, independently operated microgrids may restrict the types of data shared with other microgrids, such as raw measurements, for privacy concerns. In view of these and other shortcomings in the art, there is a significant need for the unique apparatuses, methods, systems and techniques disclosed herein. As explained in more detail below, the microgrid control systems of system 100 are each structured to perform global state estimation using only state estimations received from other microgrid control systems and local measurements of the microgrid associated with the agent microgrid control system.

Figure 2:
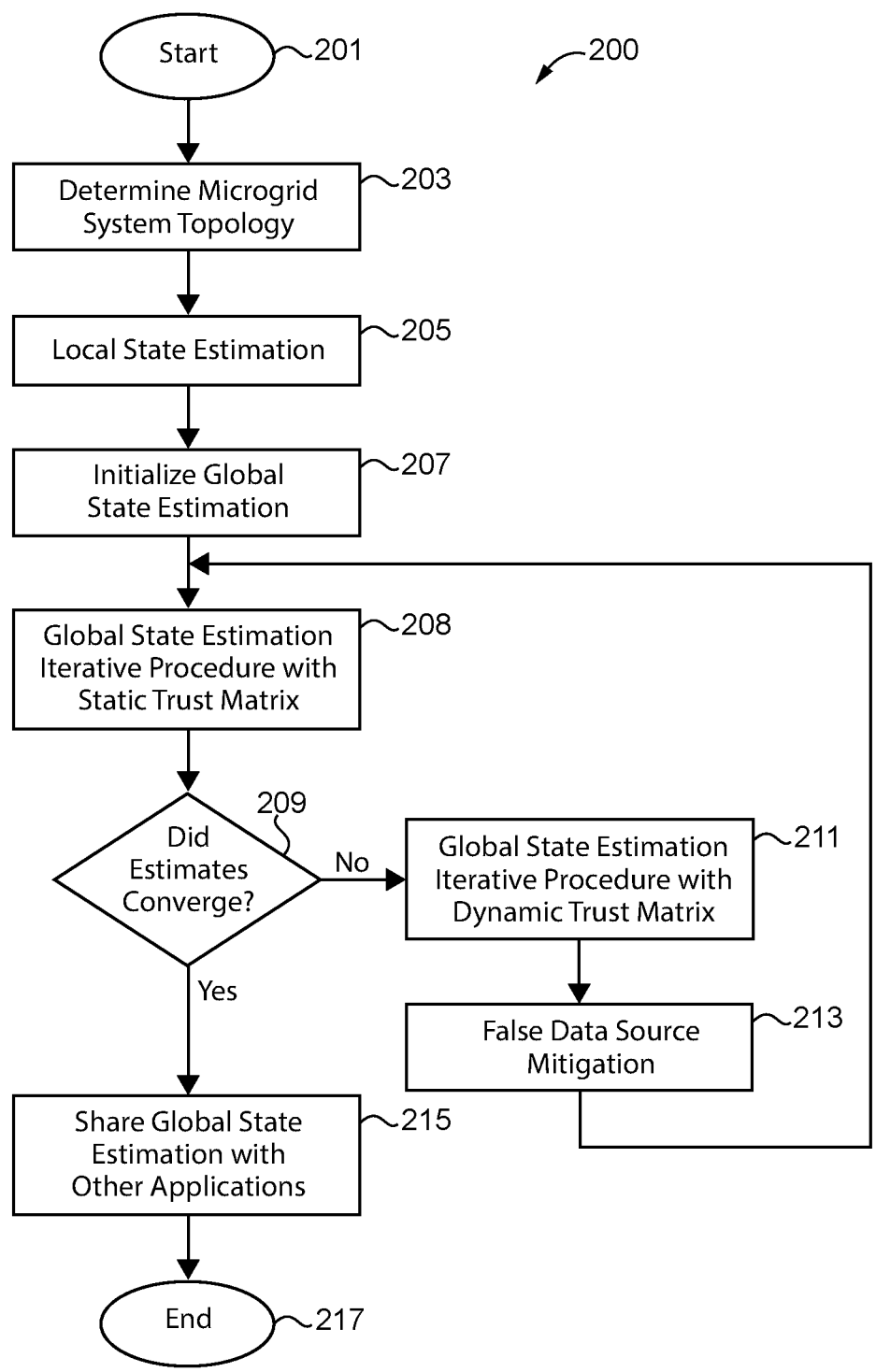
FIG. 2 is a flowchart illustrating an exemplary process for false data detection and mitigation.

With reference to FIG. 2, there is illustrated a process 200 for detecting and mitigating false data in a networked microgrid system using fully distributed state estimation. The following description of process 200 is made with reference to networked microgrid system 100 illustrated in FIG. 1. Specifically, the description of process 200 is made with reference to one microgrid control system, but it is to be understood that each microgrid control system of networked microgrid system 100 executes process 200 at the same time. Process 200 may be used in combination with other forms of networked microgrid systems. It shall be further appreciated that a number of variations and modifications to process 200 are contemplated, including, for example, the omission of one or more aspects of process 200, the addition of further conditionals and operations, and/or the reorganization or separation of operations and conditionals into separate processes.

Process 200 includes start operation 201 and proceeds to operation 203 where the microgrid control system determines the topology of the microgrid communication network by discovering other microgrid control systems and receiving information related to phase angles between microgrids. The microgrid control system does not require a power network model for state estimation. Instead, the networked microgrid system uses a fully-distributed, iterative process for identifying the number of microgrid control systems in system 100 and the phase angle differences between microgrids. In certain embodiments, each microgrid of system 100 includes a phasor measurement unit and does not need to determine phase angle differences between microgrids.

Once the microgrid control system determines the microgrid communication network topology, Process 200 proceeds to operation 205 where the microgrid control system performs local state estimation using data received from a plurality of field devices of the same microgrid as the microgrid control system. Local state estimation is a process whereby electrical or physical characteristics of the microgrid are estimated using input data related to the electrical or physical characteristics of the microgrid to be estimated. Input data from the plurality of field devices may include measurements of voltage, current, active power flow, reactive power flow, or other types of information, such as circuit breaker status, to name but a few examples. Each measurement or estimation may include a magnitude, a phase angle, or both.

In certain embodiments, local state estimation is performed using the weighted least square method. Each microgrid knows only its own local measurement vector z, local covariance matrix R, and local Jacobian matrix H. Local measurement vector z includes data from the field devices in the microgrid such as bus voltages, current injections, and current flow. The matrix H is the Jacobian matrix of h(x), a nonlinear measurement function for each microgrid $$\left(H(x) = \left[\frac{\partial h(x)}{\partial x}\right]\right).$$

Matrix R is the measurement covariance matrix (R=diag $\{\sigma_1^2, \sigma_2^2, \ldots, \sigma_m^2\}$) including the standard deviation of each measurement. Using the following set of equations in an iterative process, each microgrid performs local state estimation, where G(x) is the gain matrix, W is the inverse of the covariance matrix R, x is the local state estimation vector, and i is the iteration number.

$$G=H^TWH \; \Delta z(x^i)=z-h(x^i) \; [G(x^i)]\Delta x^{i+1}=H^T(x^i)R^{-1}[z-h(x^i)]\Delta x^{i+1}=x^{i+1}-x^i \quad (1)$$

Process 200 proceeds to operation 207 where the microgrid control system initializes global state estimation using the discovered microgrid topology, its own calculated local state estimation, and the local state estimations calculated by the other microgrid control systems of the networked microgrid. Global state estimation is a process whereby electrical or physical characteristics of all microgrids in a networked microgrid system are estimated using input data related to the electrical or physical characteristics of the networked microgrid system to be estimated. For example, global state estimation may include estimating the bus voltages for all buses in the nested microgrid system as well as estimating current flow through all microgrids in the nested microgrid system. Process 200 implements a distributed bi-level algorithm to achieve global state estimation of the networked microgrid system while respecting local information policy and privacy, as each microgrid control system knows only its own measurements. The data exchanged between microgrids during global state estimation includes only the local state estimations for determining an initial global state estimation and global state estimations iteratively calculated as described below. Each microgrid control system does not require raw field device data from another microgrid or a network model in order to perform global state estimation.

The microgrid control system receives the local state estimation in the form of a vector from each of the other microgrid control systems in the networked microgrid system. Using each local state estimation vector, the microgrid control system generates a global estimate vector by combining the local state estimation vectors into one vector.

In addition to generating the global state estimation vector during operation 207, the microgrid control system generates a trust matrix to assign a weighted value to each microgrid-microgrid relationship. The networked microgrid system can be represented in a dynamic undirected graph as a plurality of microgrid control systems. A trust matrix, or adjacency matrix, $A=[a_{kl}] \in \mathbb{R}$ represents the nonnegative weights that an agent microgrid control system k conveys to communications received from neighbor microgrid control system l in the networked microgrid system.

Coefficient $a_{kl}$ is a trust factor that each microgrid control system places on the other. The coefficients do not need to be symmetric, i.e., $a_{kl} \neq a_{lk}$, but each coefficient must be greater than or equal to zero, the sum of trust factors assigned by one microgrid control system to neighbors must equal one, and the trust factor assigned to a microgrid control system which is not a neighbor must be zero.

$$a_{kl} \geq 0, \Sigma_{k=1}^{n} a_{kl}=1 \text{ and } a_{kl}=0, \text{ if } l \notin N_k \quad (2)$$

Trust factors may be assigned such that a trust factor between an agent microgrid control system and its neighbor is equal to the inverse of the maximum of the number of connected microgrid control systems to either the agent microgrid control system or the neighbor microgrid control system, and a trust factor between a microgrid control system and the microgrid control system itself is equal to one minus the sum of the trust factors between the microgrid control system and its neighbors. The equation set (3) illustrates the described assignment, where $n_k$ is the number of connected microgrid control systems of agent microgrid control system k including microgrid control system k itself, $n_l$ is the number of connected microgrid control systems of neighbor microgrid control system l including microgrid control system l itself, and $N_l$ is the neighborhood of neighbor l.

$$a_{kl} = \begin{cases} \frac{1}{\max(n_k, n_l)}, & k \in N_l \setminus \{l\} \\ 1 - \sum_{k \in N_l \setminus \{l\}} a_{kl}, & k = l \end{cases} \quad (3)$$

In other words, the trust factor from k to l depends on the maximum number of neighbors either microgrid control system has, and the self-weight brings the total of each row (and column) in A to one. The trust matrix may be recalculated in response to a change in system topology, but otherwise remains static.

Process 200 proceeds to operation 208 where an iterative global state estimation procedure is performed using the global estimate vector and the trust matrix generated during operation 207. Using the global state estimation vector and the trust matrix, the microgrid control systems of the networked microgrid system use a diffusion strategy and peer-to-peer iterative communication to perform global state estimation. The diffusion algorithm considers a collection of N microgrid control systems estimating the same parameter vector, $\omega^0$, size of N×1. Diffusion algorithms employ two types of strategies: Combine-then-Adapt (CTA) and Adapt-then-Combine (ATC). ATC can be summarized as follows: At every iteration instant i, ATC strategy performs two steps. The first step is an information exchange step where microgrid control system k receives from its neighbors their moments $\{R_{u,l}, r_{du,l}\}$. Micro grid control system k combines this information and uses it to update its existing estimate $\omega_{k,i-1}$ to an intermediate value $x_{MGglobal_{k,i}}$. All other microgrid control systems in the networked microgrids system are performing a similar step and updating their estimates $\{\omega_{k,i-1}\}$ into intermediate estimates $\{x_{MGglobal_{k,i}}\}$ by using information from their neighbors. The second step is an aggregation step where microgrid control system k combines the intermediate estimates of its neighbors to obtain its update estimate $\omega_{k,i}$.

Global state estimation is performed in an iterative process where the global state estimation calculated by agent microgrid control system k is updated at each iteration using equation set (4) where $x_{MGglobal_{k,i}} \in \mathbb{R}$ denotes the state of agent microgrid control system k at iteration i, $\omega_{k,i}$ is the intermediate variable for agent k at iteration i, $\mu_k$ is a nonnegative updating parameter of agent microgrid control system k, and $\nabla_{107} J_l (\omega_{k,i-1})$ is the stochastic gradient for agent microgrid control system k of the intermediate state $\omega$ at iteration i.

$$ATC_{MG\_State} = \begin{cases} x_{MGglobal_{k,i}} = \omega_{k,i-1} - \mu_k \nabla_\omega J_l(\omega_{k,i-1}) \\ \omega_{k,i} = \sum_{l \in N_k} a_{kl} X_{MGglobal_{k,i-1}} \end{cases} \quad (4)$$

In certain embodiments, $\mu_k$ is 0.2 and $v_k$ is 0.01. In other embodiments, $\mu_k$ is within a range from 0 and 1 and $v_k$ is within a range from 0 and 0.1. The stochastic gradient is the difference of $\omega$ from one iteration to the other. Each microgrid control system keeps track of its gradient and updates the combination of all its neighbors accordingly.

During each iteration, the microgrid controls system transmits its own updated global state estimation to the other microgrid control systems and receives updated global state estimations from each of the other microgrid control systems. The microgrid control system compares its own updated global state estimation with the updated global state estimations calculated by other microgrid control systems to determine whether all global state estimations have converged, that is the standard deviation of the global state vector is below a threshold. For example, the threshold may be, $\sigma<0.001$ or $\sigma<0.1$, to name but a few examples. Operation 208 continues until either all global state estimations have converged or all global state estimations have not converged but a defined period of calculation ends. The defined period of calculation may be a certain number of iterations or a certain amount of iteration, to name but a few examples.

Process 200 proceeds to conditional 209 where the microgrid control system determines whether all the global state estimations calculated by all the microgrid control systems of the networked microgrid system have converged.

Process 200 proceeds from conditional 209 to operation 215 if all global state estimations have converged. At operation 215, a global state estimation is made available for use by other applications. For example, the global state estimation may be used for market simulations, stability analysis, and demand response, to name but a few examples.

If the global state estimations have not converged, process 200 proceeds from conditional 209 to operation 211 where the microgrid control system transitions from a normal estimation mode to a false data mitigation mode. Under normal conditions, global state estimation applies a static trust matrix as the optimal policy for achieving the best convergence precision result. When global state estimations are not converging, microgrid control systems use a modified global state estimation equation set with a dynamic trust matrix to detect a compromised microgrid control system. Using the dynamic trust matrix, microgrid control systems reduce trust factors of neighbors and may cut links entirely if a trust factor decreases below a threshold. A trust factor of a neighbor is reduced if the neighbor's global state estimation fails to cluster with other global state estimations due to noise in the neighbor's global state estimation.

In false data mitigation mode, trust factors are assigned reduced weights depending on whether noise is detected in a received global state estimate, indicating a compromised microgrid control system. Instead of equation sets (3) and (4), the following equation set (5) is calculated iteratively in order to detect comprised microgrid control systems, where k is the agent microgrid control system, l is the neighbor microgrid control system, $x_{MGglobal_{k,i}} \in \mathbb{R}$ denotes the state of agent k at iteration i, $\omega_{k,i}$ is the intermediate variable for agent k at iteration i, $\mu_k$ is a nonnegative updating parameter of agent k, $\nabla_\omega J_l(\omega_{k,i-1})$ is the stochastic gradient for agent k of the intermediate state $\omega$ at iteration i−1, $v_k$ is the forgetting factor, and $\gamma_{kl}^2$ is the instantaneous error metric.

$$x_{MGglobal_{k,i}} = \omega_{k,i-1} - \mu_k \nabla_\omega J_i(\omega_{k,i-1}) \quad (5)$$

$$\gamma_{kl}^2(i) = (1 - v_k)\gamma_{kl}^2 + v_k \|\omega_{k,i-1} - x_{MGglobal_{k,i}}\|_2^2$$

$$a_{kl}(i) = \frac{\gamma_{kl}^{-2}(i)}{\sum_{n \in N_k} \gamma_{kn}^{-2}(i)}$$

$$\omega_{k,i} = \sum_{l \in N_l} a_{kl} x_{MGglobal_{k,i}}$$

In certain embodiments, $\mu_k$ is 0.2 and $v_k$ is 0.01. In other embodiments, $\mu_k$ is within a range from 0 and 1 and $v_k$ is within a range from 0 and 0.1. The stochastic gradient is the difference of $\omega$ from one iteration to the other. Each microgrid control system keeps track of its gradient and updates the combination of all its neighbors accordingly.

Process 200 proceeds from operation 211 to operation 213 where the source of false data is removed from further consideration by each microgrid control system for the remainder of process 200. For example, each microgrid control system may update its global state estimation vector by removing global state estimations associated with the false data. In certain embodiments, one or more microgrid control systems perform operations 203, 205 and 207 again in order to remove false data sources from future global state estimations. In certain embodiments, the microgrid control system may transmit an alarm to a system operator or block data from being collected from the data source for state estimation.

Process 200 proceeds from operation 213 to operation 208 where the microgrid control system continues the iterative procedure of global state estimation using equation set (4) and the static trust matrix calculated using equation set (3) without the global state estimations removed in operation 211. Operation 208 continues until the remaining global state estimations converge. Process 200 then proceeds to conditional 209, operation 215, and finally to end operation 217.

Figure 3:
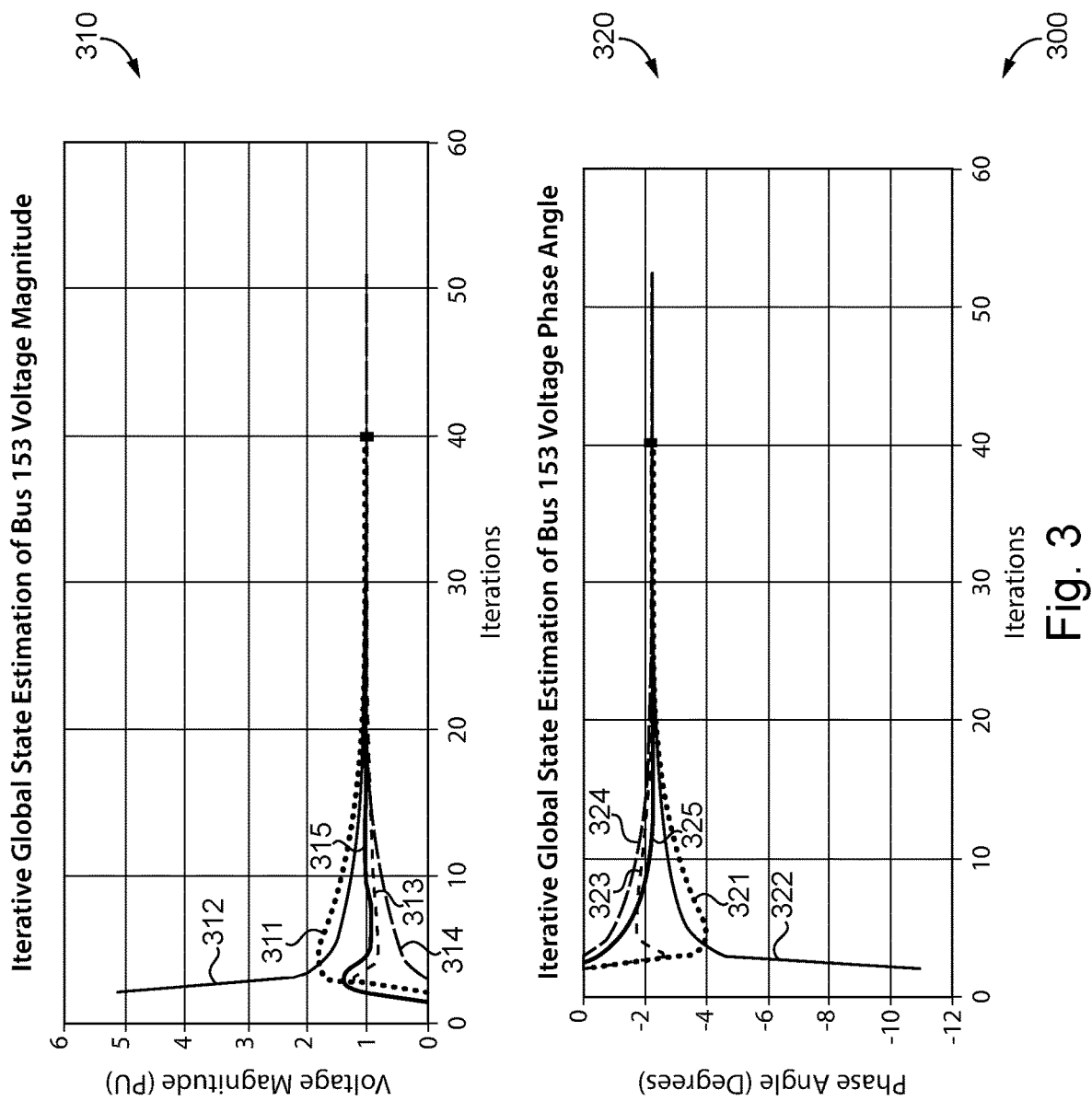
FIG. 3 is a set of graphs illustrating global state estimation with the networked microgrid system in FIG. 1.

With reference to FIG. 3, there is a plurality of graphs 300 illustrating converging global state estimations performed by system 100 according to process 200. Each microgrid control system of system 100 uses local measurements from the field devices of its own microgrid to calculate a local state estimation. Vector set (6) includes a local state estimation vector for every microgrid, each vector including an initial voltage and phase angle $x_1^{(n)}(0)$ estimate for each bus in the microgrid. At the $0^{th}$ iteration, each microgrid sets the initial estimate vector $x_{MGn}(0)$.

$$x_{MG110}^T(0)=[x_1^{(n)}(0)x_3^{(n)}(0)x_4^{(n)}(0)x_5^{(n)}(0)x_6^{(n)}(0)x_7^{(n)}$$
$$(0)x_8^{(n)}(0)x_9^{(n)}(0)]x_{MG120}^T(0)=[x_1^{(n)}(0)x_2^{(n)}$$
$$(0)x_3^{(n)}(0)x_4^{(n)}(0)x_5^{(n)}(0)x_6^{(n)}(0)]x_{MG130}^T(0)=$$
$$[x_1^{(n)}(0)x_2^{(n)}(0)x_3^{(n)}(0)x_4^{(n)}(0)x_5^{(n)}(0)x_6^{(n)}(0)x_7^{(n)}$$
$$(0)]x_{MG140}^T(0)=[x_1^{(n)}(0)x_2^{(n)}(0)x_3^{(n)}(0)x_4^{(n)}$$
$$(0)x_5^{(n)}(0)x_6^{(n)}(0)]x_{MG150}^T(0)=[x_1^{(n)}(0)x_2^{(n)}$$
$$(0)x_3^{(n)}(0)x_4^{(n)}(0)x_5^{(n)}(0)x_6^{(n)}(0)x_7^{(n)}(0)x_8^{(n)}$$
$$(0)x_9^{(n)}(0)] \quad (6)$$

Once each microgrid control system has received a local state estimation vector from each of the other microgrid control systems, each microgrid control system generates a global estimate vector $x_{MGglobal}$ using vector set (6):

$$x_{MGglobal}(0)=[x_{MG1}^T(0)x_{MG2}^T(0)x_{MG3}^T$$
$$(0)x_{MG4}^T(0)x_{MG5}^T(0)]^T \quad (7)$$

Using equation set (3), each microgrid control system calculates a trust matrix. The following matrices show the topology matrix of system 100 being converted into a trust matrix using equation set (3).

$$\begin{vmatrix} 1 & 1 & 1 & 0 & 0 \\ 1 & 1 & 0 & 0 & 0 \\ 1 & 0 & 1 & 1 & 1 \\ 0 & 0 & 1 & 1 & 0 \\ 0 & 0 & 1 & 0 & 1 \end{vmatrix} \rightarrow \begin{vmatrix} 0.4167 & 0.3333 & 0.2500 & 0.0000 & 0.0000 \\ 0.3333 & 0.6667 & 0.0000 & 0.0000 & 0.0000 \\ 0.2500 & 0.0000 & 0.2500 & 0.2500 & 0.2500 \\ 0.0000 & 0.0000 & 0.2500 & 0.7500 & 0.0000 \\ 0.0000 & 0.0000 & 0.2500 & 0.0000 & 0.7500 \end{vmatrix} \quad (8)$$

Using trust matrix (8) and equation set (4), each microgrid control system iteratively calculates global state estimation as described above with respect to operation in FIG. 2. Graph 310 includes global state estimations 311-315 for bus 153 voltage magnitude calculated by microgrids 110-150, respectively, at each iteration. Graph 320 includes global state estimations 321-325 for bus 153 voltage phase angle calculated by microgrids 110-150, respectively, at each iteration. At the $40^{th}$ iteration, the global state estimations of each microgrid control system converge, having a standard deviation of less than $1 \times 10^{-5}$.

Figure 4:
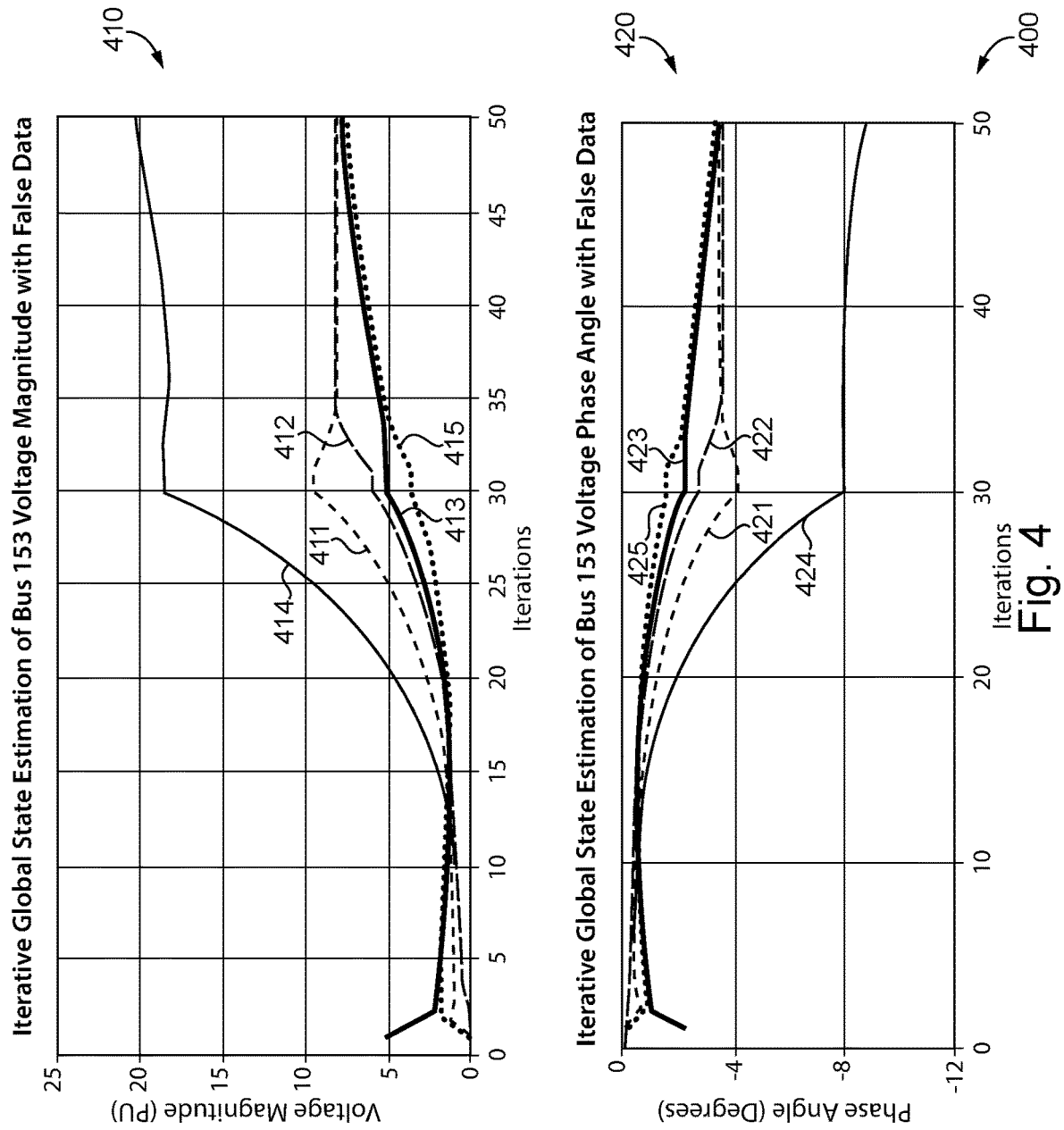
FIG. 4 is a set of graphs illustrating false data mitigation with the networked microgrid system in FIG. 1.

With reference to FIG. 4, there is a plurality of graphs 400 illustrating false data detection and mitigation during global state estimation performed by system 100 according to process 200 in FIG. 2. Graph 410 includes values of global state estimation 411-415 for the bus 153 voltage magnitude performed by microgrids 110-150, respectively, at each iteration. Graph 420 includes values of global state estimations 411-415 for bus 153 voltage magnitude performed by microgrids 110-150, respectively, at each iteration. The global state estimation calculated by microgrid control system 141, illustrated as estimates 414 and 424, was compromised by an attacker introducing a 10% bias factor to the global state estimation, forcing it to send inaccurate estimation to neighbor agents.

In certain embodiments, false data may be applied to one or more global state estimations in a global state estimation vector so as to compromise some or all of the global state estimations from one microgrid. In certain embodiments, false data may be applied to global state estimations from more than one microgrid control system.

At the $0^{th}$ iteration, the microgrid control system operation is in normal estimation mode. Starting at the $10^{th}$ iteration, the 10% bias factor is added to the global estimations 414, 424 of microgrid control system 141. Once the cyber attack is initiated, the global state estimations of the microgrid control systems start to diverge from each other. The microgrid control systems continue to operate under normal estimation mode until the $30^{th}$ iteration.

At the 30$^{th}$ iteration, the microgrid control systems determine that the global state estimations have not converged, and enter false data mitigation mode in response. After the 30$^{th}$ iteration, estimations without false data initially tend to form clusters based on their trust weights. With respect to graph 410, estimate 414 of microgrid control system 141 deviates significantly from two clusters, which are formed by estimates 411 and 412 of microgrid control systems 111 and 121 and estimates 413 and 415 of microgrid control systems 131 and 151. As iterations proceed, estimates 411, 412, 413, and 415 converge to each other while the compromised estimate 414 diverges.

The adaptation of the trust matrix over iterations is shown by matrices (9)-(12): matrix (9) is the dynamic trust matrix at iteration 31, matrix (10) is the dynamic trust matrix at iteration 32, matrix (11) is the dynamic trust matrix at iteration 40, and matrix (12) is the dynamic trust matrix at iteration 50. As iterations proceed from the 30$^{th}$ iteration, there is a decrease of matrix A (4, 3), which is the trust factor of microgrid control system 131 relative to global state estimates received from microgrid control system 141. In certain embodiments, isolation will occur when a trust factor decreases below a predefined threshold. For example, the predefined threshold could be $a_{kl} < 0.00001$, $a_{kl} < 0.005$, or $a_{kl} < 0.05$, to name but a few examples.

$$\begin{vmatrix} 0.8130 & 0.4514 & 0.0687 & 0.0000 & 0.0000 \\ 0.1322 & 0.5486 & 0.0000 & 0.0000 & 0.0000 \\ 0.0548 & 0.0000 & 0.8241 & 0.7313 & 0.2111 \\ 0.0000 & 0.0000 & 0.0057 & 0.2687 & 0.0000 \\ 0.0000 & 0.0000 & 0.1015 & 0.0000 & 0.7889 \end{vmatrix} \quad (9)$$

$$\begin{vmatrix} 0.6703 & 0.6820 & 0.0755 & 0.0000 & 0.0000 \\ 0.2363 & 0.3180 & 0.0000 & 0.0000 & 0.0000 \\ 0.0934 & 0.0000 & 0.7326 & 0.7067 & 0.4998 \\ 0.0000 & 0.0000 & 0.0039 & 0.2933 & 0.0000 \\ 0.0000 & 0.0000 & 0.1880 & 0.0000 & 0.5002 \end{vmatrix} \quad (10)$$

$$\begin{vmatrix} 0.5579 & 0.6558 & 0.0861 & 0.0000 & 0.0000 \\ 0.2700 & 0.3442 & 0.0000 & 0.0000 & 0.0000 \\ 0.1721 & 0.0000 & 0.6498 & 0.6954 & 0.4828 \\ 0.0000 & 0.0000 & 0.0031 & 0.3046 & 0.0000 \\ 0.0000 & 0.0000 & 0.2610 & 0.0000 & 0.5172 \end{vmatrix} \quad (11)$$

$$\begin{vmatrix} 0.4296 & 0.6068 & 0.1125 & 0.0000 & 0.0000 \\ 0.2673 & 0.3932 & 0.0000 & 0.0000 & 0.0000 \\ 0.3031 & 0.0000 & 0.5679 & 0.6827 & 0.4906 \\ 0.0000 & 0.0000 & 0.0024 & 0.3173 & 0.0000 \\ 0.0000 & 0.0000 & 0.3173 & 0.0000 & 0.5094 \end{vmatrix} \quad (12)$$

With reference to FIG. 5, there is a table illustrating an exemplary microgrid control system and phase angle discovery process for system 100 in FIG. 1. For every communication between microgrid control systems, all messages sent from one microgrid control system to another microgrid control system arrive without disruption in a finite time, however not necessarily in the same order they are published. Furthermore, each microgrid control system is aware of its neighbors and the identity of a neighbor from which a message is received.

In one example, the grid point of common coupling of microgrid 110 is determined to be the reference bus for phase angle computations. The microgrid control systems will exchange information to determine the phase angle difference between itself and a neighboring microgrid so that each microgrid can compute its own phase angle displacement relative to the reference bus.

At iteration (0), each microgrid control system is aware of its own unique identity. For each iteration after the 0$^{th}$ iteration, each microgrid control system acquires information by requesting data from its neighbors. At iteration (1), neighbor microgrid control systems exchange information with an agent microgrid control system, also known as an agent, and new microgrid control systems and phase angle differences are discovered. Phase angles may be communicated directly or may be calculated using information exchanged between neighbors, such as exchanged voltages and power flow. For example, the following equation set (1) may be used to determine the phase angle between two adjacent microgrids where i is the interconnecting bus of one microgrid, j is the interconnecting bus of an adjacent microgrid, $\theta_{i-j}$ is the phase angle difference between bus i and bus j, $P_{ij}$ is the active power flowing on a line between bus i and bus j, $V_i$ is the voltage at bus i, $V_j$ is the voltage at bus j, $R_{ij}$ is the line resistance between bus i and bus j, and $X_{ij}$ is the line reactance between bus i and bus j.

$$G_{ij} + jB_{ij} = 1/(R_{ij} + jX_{ij}) \; P_{ij} = V_i^2 G_{ij} - V_i V_j G_{ij} \cos(\theta_i - \theta_j) + V_i V_j B_{ij} \sin(\theta_i - \theta_j) \quad (1)$$

At iteration (2), an agent microgrid control system acquires information previously acquired by its neighbors during iteration (1), namely the information from neighbors of neighbors. The process continues until none of the microgrid control systems discover new microgrid control systems. As shown in FIG. 5, the discovery process is completed at the end of the fourth iteration, which is the diameter $\Psi$ of the network. The number of microgrid control systems in the network is determined as: $N = \Psi + 1$. Distributed microgrid control system discovery is applied after each estimation process to determine how many microgrids participate for the upcoming state estimation. At the end of microgrid control system discovery, all microgrid control systems become aware of the information for $\theta_{1-2}$, $\theta_{1-3}$, $\theta_{3-4}$, $\theta_{3-5}$. Using the determined phase angle differences, each microgrid control system calculates its own phase angle difference relative to the reference bus of microgrid 110. For example, microgrid control system 151 calculates $\theta_{1-5}$ as $\theta_{1-3} - \theta_{3-5}$. Each microgrid in system 100 other than microgrid 110 will use this phase angle difference for shifting the phase angle results of local state estimation.

Figure 6A:
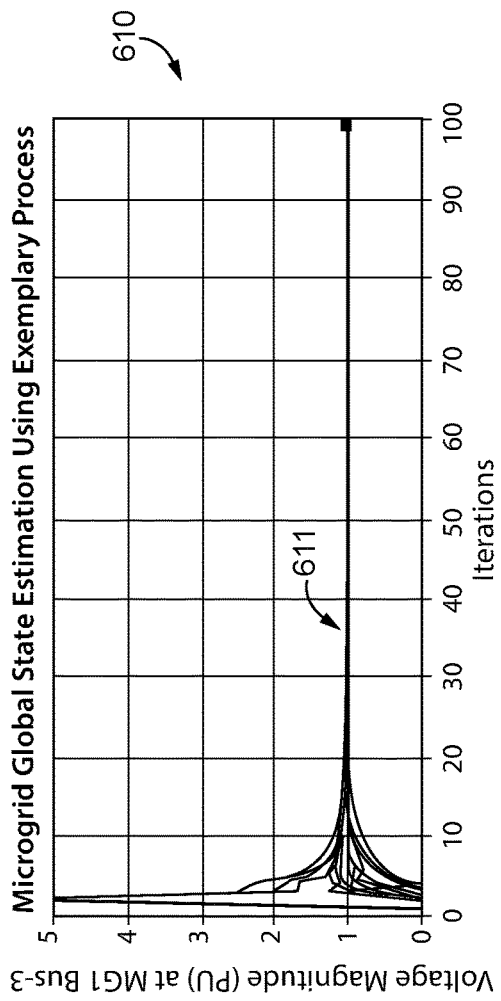
FIGS. 6A-6B is a set of graphs illustrating convergence for an exemplary distributed state estimation process and an alternative distributed state estimation process.
Figure 6B:
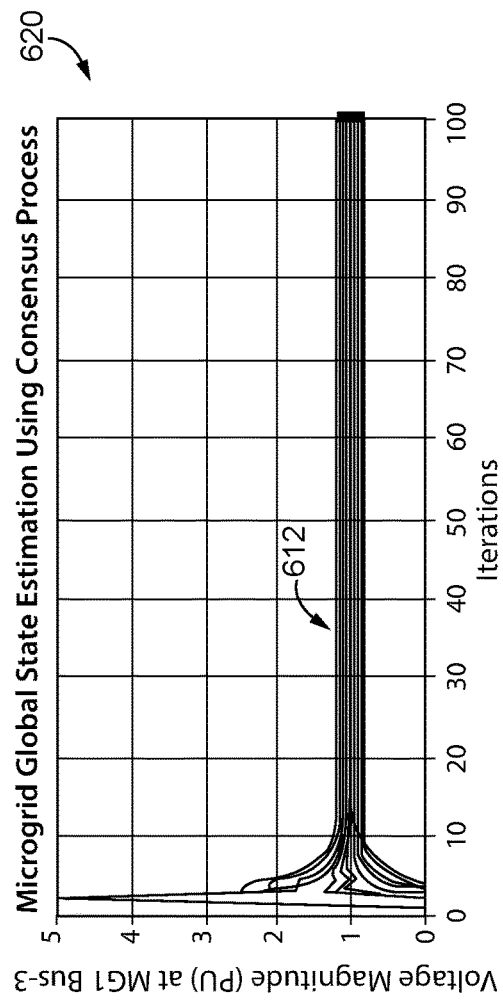

With reference to FIGS. 6A and 6B, there are graphs illustrating computational performance of an exemplary microgrid state estimation process and an alternative microgrid state estimation process using a consensus algorithm. The two processes have been implemented in a computer including a Core i7 clocking at 2.70 GHz and 8 GB RAM. The computational performance of each process is analyzed in a 30 microgrid, 300-bus network. Graph 610 in FIG. 6A illustrates execution of the normal operation mode of process 200 in FIG. 2. Graph 620 in FIG. 6B illustrates execution of another microgrid distributed state estimation process using the consensus algorithm. The plurality of estimates 612 in graph 620, through 100 iterations, do not converge to a precise estimate, having a standard deviation of 4.9×10$^{-3}$. The plurality of estimates 611 in graph 610, however, do converge to a precise estimate, having a standard deviation of 1.0461×10$^{-5}$.

Figures 7, 8:
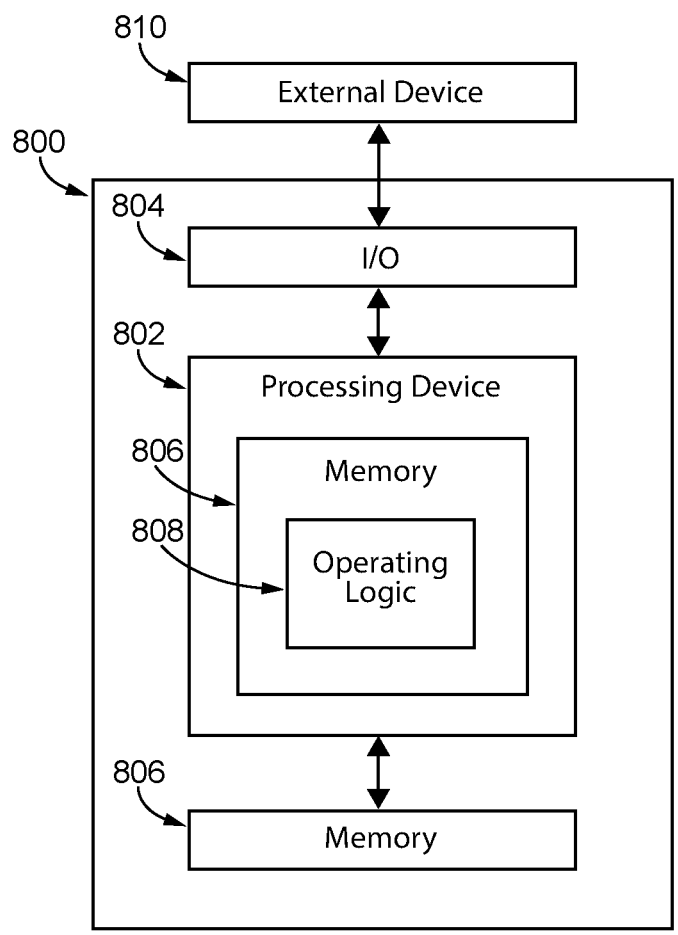
FIG. 7 is a table illustrating computational performance for an exemplary distributed state estimation process and a conventional centralized state estimation process.
FIG. 8 is a block diagram illustrating an exemplary microgrid control system.

Furthermore, as shown in the table in FIG. 7, convergence time for the exemplary global state estimation process is significantly shorter compared to a conventional centralized process for calculating the same global state estimation. The two processes have been implemented in a computer including a Core i7 clocking at 2.70 GHz and 8 GB RAM. The computational performance of each process is analyzed in a 30 microgrid, 300-bus network. Although centralized state estimation takes fewer iterations, the elapsed time for each iteration is significantly longer since matrices used in centralized state estimation are larger.

With reference to FIG. 8 there is illustrated a schematic block diagram of an exemplary microgrid control system 800 such as one of the microgrid control systems of system 100 in FIG. 1. Microgrid control system 800 includes a processing device 802, an input/output device 804, memory device 806, and operating logic 808. Furthermore, the computing device 800 communicates with one or more external device 810, including other microgrid control systems in a nested microgrid system or local field devices. Microgrid control system 800 may be a stand-alone device, an embedded system, or a plurality of devices structured to perform the functions described with respect to system 800. For example, system 151 may be incorporated into a microgrid SCADA gateway.

Input/output device 804 enables microgrid control system 800 to communicate with local field devices or other microgrids. Input/output device 804 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 804 may include more than one of these adapters, credentials, or ports, such as a first port for receiving data and a second port for transmitting data.

Processing device 802 may include one or multiple processors, Arithmetic-Logic Units (ALUs), Central Processing Units (CPUs), Digital Signal Processors (DSPs), or Field-programmable Gate Arrays (FPGAs), to name but a few examples. For forms of processing devices with multiple processing units, distributed, pipelined, or parallel processing may be used. Processing device 802 may be dedicated to performance of only the operations described herein or may be used in one or more additional applications. Processing device 802 may be of a programmable variety that executes algorithms and processes data in accordance with operating logic 808 as defined by programming instructions (such as software or firmware) stored in memory 806. Alternatively or additionally, operating logic 808 for processing device 1202 is at least partially defined by hardwired logic or other hardware. Processing device 802 may comprise one or more components of any type suitable to process the signals received from input/output device 804 or elsewhere, and provide desired output signals. Such components may include digital circuitry, analog circuitry, or a combination of both.

Memory device 806, also known as a computer readable medium, may be of one or more types of memory, such as a solid-state variety, electromagnetic variety, optical variety, or a combination of these forms, to name but a few examples. Furthermore, memory device 806 may be volatile, nonvolatile, transitory, non-transitory or a combination of these types, and some or all of memory device 806 may be of a portable variety, such as a disk, tape, memory stick, or cartridge, to name but a few examples. In addition, memory device 806 may store data that is manipulated by operating logic 808 of processing device 802, such as data representative of signals received from and/or sent to input/output device 804 in addition to or in lieu of storing programming instructions defining operating logic 808, just to name one example. Memory device 806 may be included with processing device 802 and/or coupled to processing device 802.

Further written description of a number of exemplary embodiments shall now be provided. One embodiment is a method for removing false data from a networked microgrid system including a first microgrid and a plurality of microgrids, the method comprising: calculating a first local state estimation with the microgrid control system using a first plurality of local measurements; receiving, with the microgrid control system, a plurality of local state estimations from the plurality of microgrids; calculating a plurality of global state estimations with the microgrid control system and the plurality of microgrids using the first local state estimation and the plurality of local state estimations; determining the plurality of global state estimations did not converge; detecting false data in a first global state estimation of the plurality of global state estimations calculated with the microgrid control system using the microgrid control system and the plurality of microgrids; removing the first global state estimation from the plurality of global state estimations; and iteratively updating the remaining global state estimations of the plurality of global state estimations with the microgrid control system and the plurality of microgrids until the remaining global state estimations of the plurality of global state estimations converge.

In some examples of the foregoing method, the method comprises determining a communication network topology by receiving, with the first microgrid control system, information from a first portion of the plurality of microgrids in direct communication related to the first portion, and subsequently receiving, from the first portion, information related to a second portion of the plurality of microgrids in indirect communication with the first microgrid control system. In some examples, global state estimations converge when each global state estimation has a standard deviation less than a threshold value. In some examples, calculating the plurality of global state estimations occurs using a plurality of iterations and determining the plurality of global state estimations did not converge occurs after the plurality of iterations. In some examples, detecting false data in the first global state estimation includes updating a dynamic trust matrix including a plurality of trust factors including a first trust factor corresponding to a weight applied to the global state estimation received by the first microgrid control system from one microgrid of the plurality of microgrids, and a second trust factor corresponding to a weight applied to the global state estimation calculated by the first microgrid control system. In some examples, detecting false data in the first global estimation includes updating the plurality of global state estimations using equation set (5) where k is an agent microgrid control system, l is a neighbor microgrid control system, $x_{MGglobal_{kl}} \in \mathbb{R}$ denotes the global state estimation of agent microgrid control system k at iteration i, $\omega_{k,i}$ is the intermediate variable for agent microgrid control system k at iteration i, $\mu_k$ is a nonnegative updating parameter of agent microgrid control system k, $\nabla_\omega J_l(\omega_{k,i-1})$ is a stochastic gradient for agent microgrid control system k of the intermediate state co at iteration i-l, $v_k$ is a forgetting factor, and $\gamma_{kl}^2$ is an instantaneous error metric. In some examples, each global state estimation of the plurality of global state estimations correspond to a voltage magnitude of a bus of the first microgrid.

An exemplary embodiment is a method for detecting and mitigating false data in a microgrid system comprising: operating a first microgrid control system of a first microgrid, a second microgrid control system of a second microgrid, and a third microgrid control system of a third microgrid; calculating a first local state estimation with the first microgrid control system using a first plurality of measurements, a second local state estimation with the second microgrid control system using a second plurality of measurements, and a third local state estimation with the third microgrid control system using a third plurality of measurements; receiving the first local state estimation with the second and third microgrid control systems, the second local state estimation with the first and third microgrid control systems, and the third local state estimation with the first and second microgrid control systems, calculating a first global state estimation of an electrical characteristic of the first microgrid with the first microgrid control system, a second global state estimation of the electrical characteristic with the second microgrid control system, and a third global state estimation of the electrical characteristic with the third microgrid control system, determining, with the first microgrid control system, the first global state estimation, the second global state estimation, and the third global state estimation do not converge; iteratively updating the first global state estimation with the first microgrid control system, the second global state estimation with the second microgrid control system, and the third global state estimation with the third microgrid control system using a dynamic trust matrix; detecting false data within the first global state estimation using the iterative updating of the first, second, and third global state estimations; and continuing to update the second global state estimation with the second microgrid control system and the third global state estimation with the third microgrid control system until the second global state estimation and the third global state estimation converge.

In some examples of the foregoing method, the method comprises determining communication network topology by receiving, with the first microgrid control system, information from the second microgrid control system regarding the second microgrid during a first iteration; receiving, with the second microgrid control system, information from the third microgrid control system regarding the third microgrid during the first iteration; and receiving, with the first microgrid control system, information from the second microgrid control system regarding the third microgrid during a second iteration. In some examples, the first local state estimation, the first global state estimation, the second global state estimation, and the third global state estimation is an estimated voltage of a bus of the first microgrid. In some examples, the first microgrid control system does not receive does not receive the second plurality of local measurements or the third plurality of local measurements. In some examples, calculating the first global state estimation, the second global state estimation, and the third global state estimation includes using a diffusion algorithm, and wherein continuing to update the second global state estimation and the third global state estimation includes using the diffusion algorithm. In some examples, the dynamic trust matrix includes a plurality of trust factors including a first trust factor corresponding to a weight applied to the first global state estimation by first microgrid control system and a second trust factor corresponding to a weight applied to the second global state estimation by the first microgrid control system. In some examples, iteratively updating the first global state estimation, the second global state estimation, and the third global state estimation using the dynamic trust matrix includes reducing the second trust factor to zero in response to detecting noise within the second global state estimation by the first microgrid control system. In some examples, iteratively updating the first, second, and third global state estimations includes updating the dynamic trust matrix using the following portion of equation set (5):

$$\gamma_{kl}^2(i) = (1 - v_k)\gamma_{kl}^2 + v_k \|\omega_{k,i-1} - x_{MGglobal_{k,i}}\|_2^2$$

$$a_{kl}(i) = \frac{\gamma_{kl}^{-2}(i)}{\sum_{n \in N_k} \gamma_{kn}^{-2}(i)}$$

where k is an agent microgrid control system, l is a neighbor microgrid control system, $x_{MGglobal_{k,i}} \in \mathbb{R}$ denotes a global state estimation of agent microgrid control system k at iteration i, $\omega_{k,i}$ is the intermediate variable for agent microgrid control system k at iteration i, $\mu_k$ is a nonnegative updating parameter of agent microgrid control system k, $v_k$ is a forgetting factor, and $\gamma_{k,i}^2$ is an instantaneous error metric.

An exemplary embodiment is non-transitory memory device comprising: a set of instructions structured to be executed by a processing device of a first microgrid control system of a first microgrid effective to: calculate a first local state estimation using a first plurality of measurements; receive a plurality of local state estimations from a plurality of networked microgrids coupled to the first microgrid; calculate a first global state estimation using the first local state estimation and the plurality of local state estimations; receive a plurality of global state estimations from the plurality of networked microgrids; determine the first global state estimation and the plurality of global state estimations do not converge; determine at least one global state estimation of the plurality of global state estimations includes false data by iteratively updating the first global state estimation and the plurality of global state estimations using a dynamic trust matrix configured to be updated in response to a magnitude of detected noise in the first global state estimation and the plurality of global state estimations; and iteratively update the first global state estimation until the first global state estimation converges with the global state estimations of the plurality of global state estimations that were not determined to include false data.

In some examples of the foregoing non-transitory memory device, the plurality of field devices includes a plurality of voltage sensors structured to measure a plurality of bus voltage of the first microgrid. In some examples, the set of instructions structured to be executed by a processing device are effective to determine a communication network topology by receiving information from a first portion of the plurality of networked microgrids in direct communication related to the first portion, and subsequently receiving, from the first portion, information related to a second portion of the plurality of networked microgrids in indirect communication with the first microgrid control system. In some examples, the dynamic trust matrix includes a plurality of trust factors including a first trust factor corresponding to a weight applied to the global state estimation received by the first microgrid control system from one microgrid of the plurality of microgrids, and a second trust factor corresponding to a weight applied to the first global state estimation. In some examples, determining the at least one global state estimation of the plurality of global state estimations includes false data includes using a diffusion algorithm and updating the dynamic trust matrix using the following portion of equation set (5):

$$\gamma_{kl}^2(i) = (1 - v_k)\gamma_{kl}^2 + v_k \|\omega_{k,i-1} - x_{MGglobal_{k,i}}\|_2^2$$

$$a_{kl}(i) = \frac{\gamma_{kl}^{-2}(i)}{\sum_{n \in N_k} \gamma_{kn}^{-2}(i)}$$

where k is an agent microgrid control system, l is a neighbor microgrid control system, $x_{MGglobal_{k,i}} \in \mathbb{R}$ denotes the global state estimation for agent microgrid control system k at iteration i, $\omega_{k,i}$ is the intermediate variable for agent microgrid control system k at iteration i, $\mu_k$ is a nonnegative updating parameter of agent microgrid control system k, $v_k$ is a forgetting factor, and $\gamma_{ki}^2$ is an instantaneous error metric.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

For the purposes of clearly, concisely and exactly describing non-limiting exemplary embodiments of the disclosure, the manner and process of making and using the same, and to enable the practice, making and use of the same, reference has been made to certain exemplary embodiments, including those illustrated in the figures, and specific language has been used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A method of operating a first microgrid of a networked microgrid system that includes the first microgrid and a plurality of other microgrids, the method comprising:
    measuring a first plurality of local measurements using a plurality of field devices of the first microgrid;
    calculating a first local state estimation with a microgrid control system of the first microgrid, the calculating using the first plurality of local measurements;
    receiving, by the microgrid control system, a plurality of local state estimations from the plurality of other microgrids, the local state estimations being received by way of a microgrid communication network;
    calculating, by the microgrid control system, a plurality of global state estimations with the microgrid control system and the plurality of other microgrids using the first local state estimation and the plurality of local state estimations;
    determining that the plurality of global state estimations did not converge;
    based on the determination that the plurality of global state estimations did not converge, detecting false data in a first global state estimation of the plurality of global state estimations calculated with the microgrid control system using the microgrid control system and the plurality of other microgrids;
    removing the first global state estimation from the plurality of global state estimations;
    iteratively updating the remaining global state estimations of the plurality of global state estimations with the microgrid control system and the plurality of other microgrids;
    determining that the global state estimations are not converging;
    using a modified global state estimation equation to detect a compromised microgrid control system;
    cutting links with the compromised microgrid control system;
    again iteratively updating the remaining global state estimations without global state estimations of the compromised microgrid control system until the remaining global state estimations of the plurality of global state estimations converge thereby obtaining converged global state estimations;
    monitoring the first microgrid using the converged global state estimations; and
    operating controllable devices of the first microgrid and protecting devices coupled to the first microgrid from faults and other conditions by using the converged global state estimations for stability analysis and demand response.

2. The method of claim 1, further comprising determining a topology of the microgrid communication network by receiving, with the microgrid control system, information from a first portion of the plurality of other microgrids in direct communication related to the first portion, and subsequently receiving, from the first portion, information related to a second portion of the plurality of other microgrids in indirect communication with the microgrid control system.

3. The method of claim 1, wherein the plurality of global state estimations converge when each global state estimation has a standard deviation less than a threshold value.

4. The method of claim 1, wherein calculating the plurality of global state estimations occurs using a plurality of iterations and determining that the plurality of global state estimations did not converge occurs after the plurality of iterations.

5. The method of claim 1, wherein detecting false data in the first global state estimation includes updating a dynamic trust matrix including a plurality of trust factors including a first trust factor corresponding to a weight applied to the global state estimation received by the microgrid control system from one microgrid of the plurality of other microgrids and a second trust factor corresponding to a weight applied to the global state estimation calculated by the microgrid control system.

6. The method of claim 1, wherein detecting false data in the first global state estimation includes updating the plurality of global state estimations using the following equation set:

$$[x\_MGglobal]\_(k,i) = \omega\_(k,i-1) - \mu\_k \nabla\_\omega J\_1(\omega\_(k,i-1)) \; \gamma\_kl^2(i) = (1-v\_k)\gamma\_kl^2 + v\_k|\omega\_(k,i-1) - [x\_MGglobal]\_(k,i)|^2 \; 2a\_kl(i) = (\gamma\_kl^(-2)(i))/(\Sigma\_(n \in N\_k)|[\gamma\_kn^(-2)(i)]) \; \omega\_(k,i) = \Sigma\_(l \in N\_i)|a\_kl[x\_MGglobal]\_(k,i)$$

where k is an agent microgrid control system, l is a neighbor microgrid control system, [x_MGglobal]_(k,i)∈R denotes the global state estimation of the agent microgrid control system k at iteration i, ω_(k,i) is an intermediate variable for agent microgrid control system k at iteration i, μ_k is a nonnegative updating parameter of agent microgrid control system k, ∇_ω J_1 (ω_(k,i−1)) is a stochastic gradient for agent microgrid control system k of an intermediate state ω at iteration i−1, v_k is a forgetting factor, and γ_kl^2 is an instantaneous error metric.

7. The method of claim 1, wherein each global state estimation of the plurality of global state estimations corresponds to a voltage magnitude of a bus of the first microgrid.

8. A non-transitory computer readable medium storing a set of instructions for performing certain steps of the method of claim 1 when executed by a processing device of the microgrid control system, the certain steps including calculating the first local state estimation, calculating the plurality of global state estimations, determining that the plurality of global state estimations did not converge, detecting the false data, removing the first global state estimation from the plurality of global state estimations, and iteratively updating the remaining global state estimations.

9. A method operating a microgrid system that includes a first microgrid, a second microgrid and a third microgrid that communicate via a microgrid communication network that includes communication channels coupling the first, second and third microgrids with each other, the method comprising:

operating a first microgrid control system of a first microgrid, a second microgrid control system of a second microgrid, and a third microgrid control system of a third microgrid;

obtaining a first plurality of measurements using a first plurality of field devices of the first microgrid, obtaining a second plurality of measurements using a second plurality of field devices of the second microgrid, and obtaining a third plurality of measurements using a third plurality of field devices of the third microgrid;

calculating a first local state estimation with the first microgrid control system using the first plurality of measurements, a second local state estimation with the second microgrid control system using the second plurality of measurements, and a third local state estimation with the third microgrid control system using the third plurality of measurements;

communicating between the first microgrid, the second microgrid and the third microgrid via the microgrid communication network to receive the first local state estimation by the second and third microgrid control systems, the second local state estimation by the first and third microgrid control systems, and the third local state estimation by the first and second microgrid control systems;

using the first, second, and third local state estimations to calculate a first global state estimation of an electrical characteristic of the first microgrid with the first microgrid control system, a second global state estimation of the electrical characteristic with the second microgrid control system, and a third global state estimation of the electrical characteristic with the third microgrid control system;

determining, with the first microgrid control system, that the first global state estimation, the second global state estimation, and the third global state estimation do not converge;

iteratively updating the first global state estimation with the first microgrid control system, the second global state estimation with the second microgrid control system, and the third global state estimation with the third microgrid control system using a dynamic trust matrix;

determining that the first global state estimation is not converging thereby detecting false data within the first global state estimation based on the iterative updating of the first, second, and third global state estimations;

using a modified global state estimation equation to detect that the first microgrid control system is a compromised microgrid control system;

cutting links between the first microgrid control system and the second and third microgrid control systems;

continuing to update the second global state estimation with the second microgrid control system and the third global state estimation with the third microgrid control system until the second global state estimation and the third global state estimation converge to create converged global state estimations;

monitoring the second microgrid using the converged global state estimations; and operating controllable devices of the second microgrid and protecting devices coupled to the second microgrid from faults and other conditions by using the converged global state estimations for stability analysis and demand response.

10. The method of claim 9, further comprising:

determining the microgrid communication network by receiving, with the first microgrid control system, information from the second microgrid control system regarding the second microgrid during a first iteration;

receiving, with the second microgrid control system, information from the third microgrid control system regarding the third microgrid during the first iteration; and receiving, with the first microgrid control system, information from the second microgrid control system regarding the third microgrid during a second iteration.

11. The method of claim 9, wherein the first local state estimation, the first global state estimation, the second global state estimation, and the third global state estimation are estimated voltages of a bus of the first microgrid.

12. The method of claim 9, wherein the first microgrid control system does not receive the second plurality of measurements or the third plurality of measurements.

13. The method of claim 9, wherein calculating the first global state estimation, the second global state estimation, and the third global state estimation includes using a diffusion algorithm and wherein continuing to update the second global state estimation and the third global state estimation includes using the diffusion algorithm.

14. The method of claim 9, wherein the dynamic trust matrix includes a plurality of trust factors including a first trust factor corresponding to a weight applied to the first global state estimation by the first microgrid control system and a second trust factor corresponding to a weight applied to the second global state estimation by the first microgrid control system.

15. The method of claim 14, wherein iteratively updating the first global state estimation, the second global state estimation, and the third global state estimation using the dynamic trust matrix includes reducing the second trust factor to zero in response to detecting noise within the second global state estimation by the first microgrid control system.

16. The method of claim 9, wherein iteratively updating the first, second, and third global state estimations includes updating the dynamic trust matrix using the following equation set:

$$\gamma\_kl^2(i)=(1-v\_k)\gamma\_kl^2+v\_k|\omega\_(k,i-1)-[x\_MGglobal]\_(k,i)|\_2^2 a\_kl(i)=(\gamma\_kl^(-2)(i))/(\Sigma\_(n\in N\_k)|[\gamma\_kn^(-2)(i)])$$

where k is an agent microgrid control system, l is a neighbor microgrid control system, [x_MGglobal]_(k, i)∈R denotes a global state estimation of agent microgrid control system k at iteration i, ω_(k,i) is an intermediate variable for agent microgrid control system k at iteration i, μ_k is a nonnegative updating parameter of agent microgrid control system k, v_k is a forgetting factor, and γ_kl^2 is an instantaneous error metric.

17. A non-transitory computer readable medium storing software that includes a set of instructions to be executed by a processing device of a first microgrid control system of a first microgrid, the set of instructions effective to cause the processing device to:

receive a first plurality of local measurements from a plurality of field devices of the first microgrid;

calculate a first local state estimation using a first plurality of measurements of the first microgrid;

receive a plurality of local state estimations from a plurality of networked microgrids coupled to the first microgrid;

calculate a first global state estimation using the first local state estimation and the plurality of local state estimations;

receive a plurality of global state estimations from the plurality of networked microgrids;

determine that the first global state estimation and the plurality of global state estimations do not converge;

in response to determining that the first global state estimation and the plurality of global state estimations do not converge, determine that at least one global state estimation of the plurality of global state estimations includes false data by iteratively updating the first global state estimation and the plurality of global state estimations using a dynamic trust matrix configured to be updated in response to detected noise in the first global state estimation and the plurality of global state estimations;

iteratively update the first global state estimation and the plurality of global state estimations without the false data;

determine that the global state estimations are still not converging;

use a modified global state estimation equation to detect a compromised microgrid control system;

cause links with the compromised microgrid control system to be cut;

again iteratively updating the remaining global state estimations without global state estimations of the compromised microgrid control system until the first global state estimation converges with the global state estimations of the plurality of global state estimations that were not determined to include false data thereby obtaining converged global state estimations; and control operation of operate controllable devices of the first microgrid and provide protection for devices coupled to the first microgrid from faults by using the converged global state estimations for stability analysis and demand response.

18. The non-transitory computer readable medium of claim 17 wherein the first plurality of measurements are received from a plurality of voltage sensors structured to measure a plurality of bus voltages of the first microgrid.

19. The non-transitory computer readable medium of claim 17, wherein the set of instructions are effective to cause the processing device to determine a communication network topology by receiving information from a first portion of the plurality of networked microgrids in direct communication related to the first portion, and subsequently receiving, from the first portion, information related to a second portion of the plurality of networked microgrids in indirect communication with the first microgrid control system.

20. The non-transitory computer readable medium of claim 17 wherein the dynamic trust matrix includes a plurality of trust factors including a first trust factor corresponding to a weight applied to the global state estimation received by the first microgrid control system from one microgrid of the plurality of microgrids, and a second trust factor corresponding to a weight applied to the first global state estimation.

21. The non-transitory computer readable medium of claim 17 wherein the at least one global state estimation of the plurality of global state estimations is determined to include false data by using a diffusion algorithm and updating the dynamic trust matrix using the following equation set:

$$\gamma\_kl^2(i)=(1-v\_k)\gamma\_kl^2+v\_k|\omega\_(k,i-1)-[x\_MGglobal]\_(k,i)|\_2^2 a\_kl(i)=(\gamma\_kl^(-2)(i))/(\Sigma\_(n\in N\_k)|[\gamma\_kn^(-2)(i)])$$

where k is an agent microgrid control system, l is a neighbor microgrid control system, [x_MGglobal]_(k, i)∈R denotes the global state estimation for agent microgrid control system k at iteration i, ω_(k,i) is an intermediate variable for agent microgrid control system k at iteration i, μ_k is a nonnegative updating parameter of agent microgrid control system k, v_k is a forgetting factor, and γ_kl^2 is an instantaneous error metric.

22. A microgrid coupled to the plurality of networked microgrids, wherein the microgrid is the first microgrid and comprises:

the processing device; and
the non-transitory computer readable medium of claim 17.

23. The microgrid of claim 22, further comprising:

a power source selected from the group consisting of a solar panel array, a wind turbine, and a natural gas generator;
the plurality of field devices; and
a plurality of loads coupled to receive power from the power source.

24. A method of distributing the software stored on the non-transitory computer readable medium of claim 17, the method comprising providing the software to the first microgrid for storage in a local memory of the first microgrid.

* * * * *